United States Patent
Dallmer-Zerbe et al.

(10) Patent No.: US 11,152,868 B2
(45) Date of Patent: Oct. 19, 2021

(54) POWER CONVERTER ARRANGEMENT AND METHOD FOR ITS REGULATION USING VOLTAGE SETPOINT VALUES BY USE OF A PRE-MODULATOR

(71) Applicant: SIEMENS AKTIENGESELLSCHAFT, Munich (DE)

(72) Inventors: Kilian Dallmer-Zerbe, Bubenreuth (DE); Sebastian Semmler, Nuremberg (DE); Michael Zorawik, Hallerndorf (DE)

(73) Assignee: Siemens Aktiengesellschaft, Munich (DE)

( * ) Notice: Subject to any disclaimer, the term of this patent is extended or adjusted under 35 U.S.C. 154(b) by 3 days.

(21) Appl. No.: 16/747,627

(22) Filed: Jan. 21, 2020

(65) Prior Publication Data

US 2020/0235675 A1    Jul. 23, 2020

(30) Foreign Application Priority Data

Jan. 21, 2019   (EP) .................................... 19152745

(51) Int. Cl.
  *H02M 5/293*    (2006.01)
  *H02M 1/084*    (2006.01)
  *H02M 1/088*    (2006.01)

(52) U.S. Cl.
  CPC ......... *H02M 5/293* (2013.01); *H02M 1/0845* (2013.01); *H02M 1/088* (2013.01); *H02M 5/2932* (2021.05)

(58) Field of Classification Search
  CPC .... H02M 5/293; H02M 1/0845; H02M 1/088; H02M 2005/2932; H02M 7/483; H02M 2007/4835
  See application file for complete search history.

(56) References Cited

U.S. PATENT DOCUMENTS

| 2017/0054294 A1* | 2/2017 | Lyu | H02J 3/01 |
| 2017/0163171 A1* | 6/2017 | Park | H02M 7/483 |
| 2020/0076321 A1* | 3/2020 | Ding | H02M 7/219 |

FOREIGN PATENT DOCUMENTS

| CN | 108539998 A | 9/2018 |
| WO | WO 2012103936 A1 | 8/2012 |

OTHER PUBLICATIONS

Lu Sizhao et al: "An Improved Phase-Shifted Carrier Modulation Scheme for a Hybrid Modular Multilevel Converter", IEEE Transactions on Power Electronics, Institute of Electrical and Electronics Engineers, USA, Bd. 32, Nr. 1, Seiten 81-97, XP011623357, ISSN: 0885-8993, DOI:10.1109/TPEL.2016.2532386 [gefunden am Sep. 16, 2016].

(Continued)

*Primary Examiner* — Kyle J Moody
*Assistant Examiner* — Lakaisha Jackson
(74) *Attorney, Agent, or Firm* — Laurence A. Greenberg; Werner H. Stemer; Ralph E. Locher (57) ABSTRACT

A method regulates a power converter arrangement that has at least one power converter arm with a series circuit of two-pole switching modules. Each of the switching modules contains a plurality of semiconductor switches and an energy store. At least some of the switching modules are switching modules of a first type and at least some further switching modules are switching modules of a second type. In the method, a voltage setpoint value of a power converter regulator is apportioned into a first and a second setpoint value portion. The switching modules of the first type are driven on the basis of the first setpoint value portion and the switching modules of the second type on the basis of the second setpoint value portion.

9 Claims, 4 Drawing Sheets

(56) References Cited

OTHER PUBLICATIONS

Lu Maozeng et al: "Fundamenta l-Frequency Reactive Circulating Current Injection for Capacitor Voltage Balancing In Hybrid-MMC HVDC Systems During Riding Through PTG Faults", IEEE Transactions on Power Delivery, IEEE Service Center, New York, NY, US. Bd. 33, Nr. 3, Seiten 1348-1357, XP011680389, ISSN: 0885-8977, DOI: 10.1109/TPWRD.2017.2755505 [gefunden am Apr. 6, 2018].

Zeng Rong et al: "Design and Operation of a Hybrid Modular Multilevel Converter", IEEE Transactions on Power Electronics, Institute of Electrical and Electronics Engineers, USA, Bd. 30, Nr. 3, Seiten 1137-1146, XP011561445, ISSN: 0885-8993, DOI: 10.1109/TPEL.2014.2320822 [gefunden am Oct. 14, 2014].

\* cited by examiner

POWER CONVERTER ARRANGEMENT AND METHOD FOR ITS REGULATION USING VOLTAGE SETPOINT VALUES BY USE OF A PRE-MODULATOR

CROSS-REFERENCE TO RELATED APPLICATION

This application claims the priority, under 35 U.S.C. § 119, of European application EP 191 52 745, filed Jan. 21, 2019; the prior application is herewith incorporated by reference in its entirety.

BACKGROUND OF THE INVENTION

Field of the Invention

The invention relates to a method for the regulation of a power converter arrangement that contains at least one power converter arm with a series circuit of two-pole switching modules. Each of the switching modules contains a plurality of semiconductor switches and an energy store. At least some of the switching modules are switching modules of a first type and at least some further switching modules are switching modules of a second type.

Such a method is known from international patent disclosure WO 2012/103936 A1. In each of the power converter arms of the known power converter arrangement, wherein the power converter arms each extend between one of the direct current voltage poles of the power converter arrangement and one of the alternating current voltage terminals, switching modules of the first type in the form of full-bridge switching modules and switching modules of the second type in the form of half-bridge switching modules are arranged.

A voltage setpoint value, which defines the arm voltage to be set at the power converter arm, is usually predefined in the regulation of the power converter arrangement. The voltage setpoint value is accordingly converted by a regulation apparatus of the power converter arrangement into drive signals that are transmitted to drive assemblies of the individual switching modules. Switching operations are initiated at the switching modules in accordance with the drive signals. A switching operation here changes a switch state of the switching module through appropriate switching of the semiconductor switches. Usually here the energy store of the respective switching module is connected into the current path of the respective power converter arm or is bridged.

If switching modules of two different types are used in one and the same power converter arrangement, the particular challenge arises of the simultaneous regulation or control of the two switching module types. The regulation method must in particular ensure that both switching module types are energetically balanced.

SUMMARY OF THE INVENTION

The object of the invention is that of proposing a method of the type mentioned at the beginning that enables a regulation of the power converter arrangement in the most reliable manner possible.

The object is achieved according to the invention through a generic method in which a voltage setpoint value of the power converter regulator is apportioned into a first and a second setpoint value portion, the switching modules of the first type are driven on the basis of the first setpoint value portion and the switching modules of the second type on the basis of the second setpoint value portion. An apportionment of the regulation is accordingly proposed. The group of switching modules of the first type according to the apportionment of the voltage setpoint value can accordingly be controlled in accordance with a conventional regulation for switching modules of this type. The group of switching modules of the second type according to the apportionment of the voltage setpoint value can correspondingly also be controlled in accordance with a conventional regulation for switching modules of this type. Thus, in principle, an existing regulation infrastructure of known power converter arrangements that use only one type of switching module can be used, wherein a setpoint value apportionment is positioned upstream. The use of known regulation methods and regulation structures advantageously lowers the costs of the regulation, and increases the reliability of the method since known regulation components usually already have been appropriately qualified and have been proven in the operation of power converters. In addition, the complex regulation for two switching module types can be realized through the method according to the invention in a simple and reliable manner, since a complex and costly mixed regulation of the two switching module types is avoided.

According to one form of embodiment of the invention, when the power converter arrangement is operating, a positive switching module voltage, a negative switching module voltage or a zero voltage is generated at any one time at connecting terminals of the switching modules of the first type, and a positive switching module voltage or a zero voltage is generated at any one time at the connecting terminals of the switching modules of the second type. This configuration or selection of the switching module types is particularly advantageous because in this way the possibility of voltage modulation is extended, whereby the energetic exploitation of the power converter arrangement is improved and the transmission losses reduced (if the power converter arrangement is employed in an energy transmission plant). The full-bridge switching module is a concrete example for a switching module of the first type, and a half-bridge switching module is an example for a switching module of the second type. The possible examples are not, of course, exhausted by those just mentioned. The positive switching module voltage here always corresponds to an energy store voltage present at the energy store of the switching module. The negative switching module voltage corresponds to the energy store voltage, but with a negative polarity.

The voltage setpoint value is preferably apportioned by a pre-modulator, wherein the first setpoint value portion is transmitted to a first control module which generates control signals for control of the switching modules of the first type on the basis of the first setpoint value portion, and the second setpoint value portion is transmitted to a second control module which generates control signals for control of the switching modules of the second type on the basis of the second setpoint value portion. A regulation module which, as an independent hardware unit or as part of the overall regulation structure, manages the setpoint value apportionment is provided with the pre-modulator. In other words, the pre-modulator can be a software package or also may be an independent assembly within the regulation apparatus. In some applications, the first and the second control module can also be referred to as modulators since they are responsible for a suitable modulation of the switching processes of the switching modules. A particularly simple structure of the regulator can be realized with the pre-modulator. It is even possible, in connection with an extension by the pre-modulator, to continue to use already known regulation apparatuses which are employed in power converter arrangements with only one switching module type.

Preferably the voltage setpoint value is apportioned while taking into consideration the number of switching modules of the first type and the number of switching modules of the second type in the at least one power converter arm, preferably in each power converter arm, as well as taking switching states of the switching modules into account. Impermissible setpoint value specifications can in particular be avoided in this way. Setting a negative switching module voltage for a half-bridge switching module would, for example, be an impermissible setpoint value specification.

The voltage setpoint value is expediently apportioned taking switching module voltages, or the energy store voltages of the switching modules, into consideration. This procedure enables efficient energetic balancing. It is, in particular, possible to avoid the switching module voltages "falling apart", i.e. the energy store voltages of the energy stores of the switching modules deviating too far from a desired specification value such as a mean value.

A load flow direction of a power converter load flow can advantageously be determined from an arm current of the power converter arrangement and a direct current on the direct-voltage side by the pre-modulator. The arm current here is the current flowing through the power converter arm. This is particularly advantageous to applications in energy transmission.

According to one form of embodiment of the invention, the switching modules of the power converter arm are operated with a modulation depth greater than one. All the power converter arms of the power converter arrangement provide an arm voltage which, in operation, is an overlay of a direct voltage UarmDC and of an alternating voltage UarmAC. The modulation depth M is the ratio between these two portions: M=|UarmAC|/UarmDC. The power converter arrangement can be exploited energetically better with a modulation depth of greater than one. The arm voltage falls here, sometimes below the value zero, so that in these cases the switching modules of the first type are particularly heavily stressed, which is appropriately taken into account in the power converter regulation.

An energy regulation is preferably carried out by an energy regulator, wherein an energy specification for a total energy of the switching modules of the first type that is to be set is provided at an output of the energy regulator. The energy specification is transmitted to the pre-modulator. The voltage setpoint value is apportioned depending on the energy specification, in particular through appropriate apportionment of the voltage setpoint value. The total energy corresponds to the sum of the switching module voltages of the switching modules concerned. In this way it is possible to ensure that the switching module voltages or the energy store voltages of the switching modules of the first type, and the switching module voltages or the energy store voltages of the switching modules of the second type, do not differ from one another by more than a predefined threshold value. This could, for example, occur if, independently of the energy specification, the voltage setpoint value were always apportioned into a larger positive portion for the switching modules of the first type and an always smaller positive portion for the switching modules of the second type.

The energy specification is particularly preferably determined depending on a mean energy store voltage of the switching modules of the first type and a mean energy store voltage of the switching modules of the second type. The deviations of the switching module voltage or of the energy store voltage can in this way be referred to the corresponding mean values.

The invention further relates to a power converter arrangement that contains at least one power converter arm with a series circuit of two-pole switching modules wherein each of the switching modules contains a plurality of semiconductor switches and an energy store. At least some of the switching modules are switching modules of a first type and at least some further switching modules are switching modules of a second type. The invention additionally relates to a regulation apparatus.

Such a power converter arrangement is known from the previously mentioned international patent disclosure WO 2012/103936 A1.

The object of the invention consists in the provision of such a power converter arrangement whose operation is as reliable as possible.

The object is achieved according to the invention with a conventional power converter arrangement having a regulation apparatus that is configured to carry out a method according to the invention.

The advantages of the power converter arrangement according to the invention result in particular from the suitability for carrying out the method according to the invention and the previously described advantages associated therewith. The design of the power converter arrangement can, of course, comprise all the variants and features that were described above in connection with the method, both individually as well as in combination.

Other features which are considered as characteristic for the invention are set forth in the appended claims.

Although the invention is illustrated and described herein as embodied in a power converter arrangement and a method for its regulation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
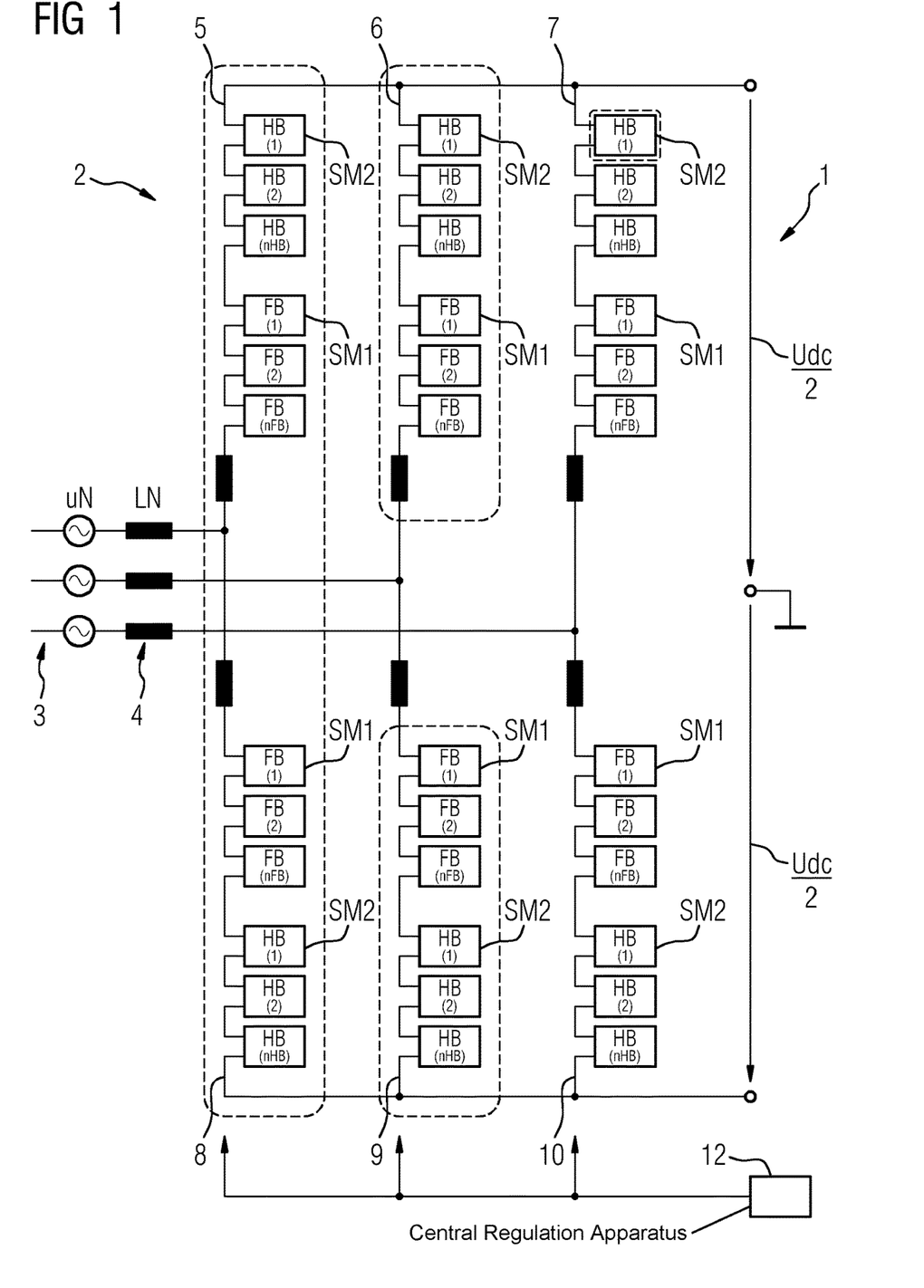
FIG. 1 is a schematic illustration of an exemplary embodiment of a power converter arrangement according to the invention.

Referring now to the figures of the drawings in detail and first, particularly to FIG. 1 thereof, there is shown a power converter arrangement 1. The power converter arrangement 1 contains a modular multistage converter (MMC) 2, which, in the illustrated example, is connected by a grid transformer 4 (wherein only the secondary-side windings are illustrated in FIG. 1) to the MMC 2 for converting an alternating voltage of an alternating voltage grid 3 into a direct voltage Udc.

The MMC 2 contains six power converter arms 5-10 that are connected to one another in a double-star circuit. Each of the identically constructed power converter arms 5-10 contains an arm inductance 11 as well as a series circuit of two-pole switching modules SM1 of the first type and switching modules SM2 of the second type. The number of switching modules SM1 or SM2 in each power converter branch 5-10 is also in principle arbitrary, and can be adjusted to the particular application. The switching modules SM1 of the first type can for example be full-bridge switching modules, the switching modules SM2 of the second type for example half-bridge switching modules, whose construction will be considered in more detail in the following FIGS. 2 and 3. Each switching module SM contains controllable semiconductor switches, e.g. IGBTs or the like, an energy store and a control assembly by which the semiconductor switches can be driven. It is, furthermore, entirely conceivable that the power converter arrangement 1 contains further types of switching module.

The power converter arrangement 1 further contains a central regulation apparatus 12 that is configured for the regulation of the MMC 2 and for the drive of the switching modules SM. The regulation apparatus 12 receives, from a higher-level instance, specifications relating to the required real power and reactive power that are converted by the regulation unit into setpoint values of some regulation parameters. The regulation parameters can, for example, be an alternating-voltage side voltage Uac, an alternating-voltage side current Iac, a direct-voltage side current Idc and/or a direct-voltage side voltage Udc. In power converter installations that are configured as a symmetrical monopole, a voltage between the positive direct-voltage pole and the ground potential, Udc+, and a voltage between the negative direct-voltage pole and the ground potential, Udc−, are significant.

Figure 2:
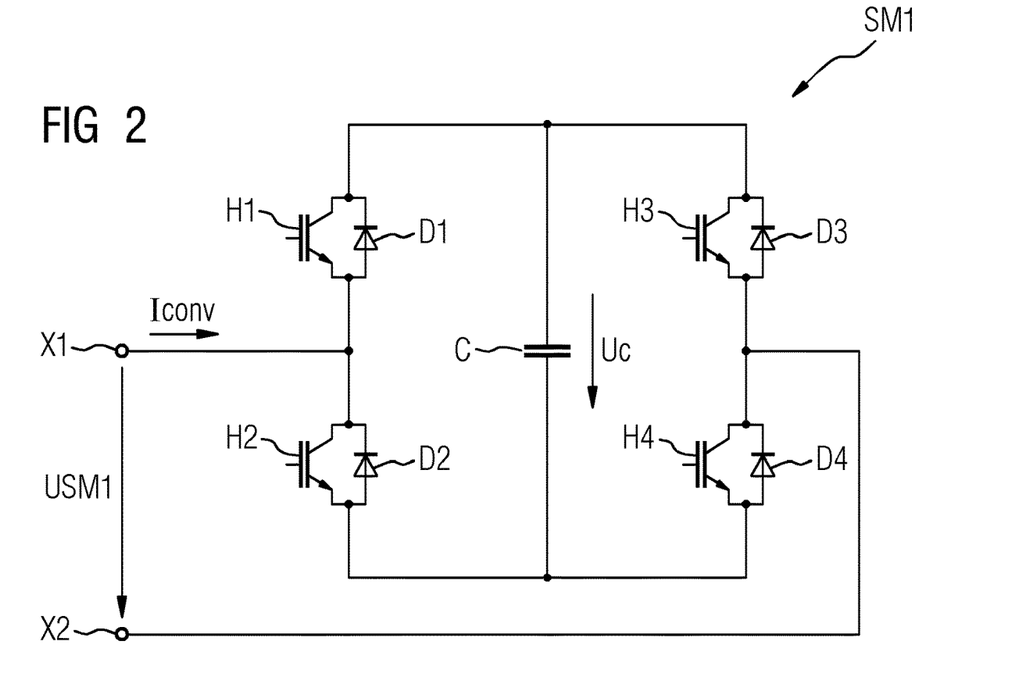
FIG. 2 is a schematic representation of an example of a switching module of a first type.

FIG. 2 shows a switching module SM1 of the first type which is suitable for the power converter of FIG. 1 and which is connected in a full-bridge circuit. The switching module SM1 contains a first semiconductor switch H1 which can be switched off, to which a first freewheeling diode D1 is connected antiparallel, a second semiconductor switch H2 which can be switched off to which a second freewheeling diode D2 is connected antiparallel, wherein the first and the second semiconductor switches H1, H2 are connected to one another in a first semiconductor series circuit and have the same forward conduction direction. The switching module SM2 further contains a third semiconductor switch H3 which can be switched off, to which a third freewheeling diode D3 is connected antiparallel, and a fourth semiconductor switch H4 which can be switched off to which a fourth freewheeling diode D4 is connected antiparallel. The third and the fourth semiconductor switches H3, H4 are connected to one another in a second semiconductor series circuit and have the same forward conduction direction. The two semiconductor series circuits are arranged in parallel with one another and with an energy store C in the form of a capacitor at which a capacitor voltage Uc is present. The switching module SM1 further contains a first connecting terminal X1 that is arranged between the semiconductor switches H1, H2 of the first semiconductor series circuit, and a second connecting terminal X2 that is arranged between the semiconductor switches H3, H4 of the second semiconductor series circuit. Through suitable drive of the semiconductor switches H1-4, a switching module voltage USM1 can be generated at the terminals X1, X2 that corresponds to the capacitor voltage Uc, the negative capacitor voltage −Uc, or, however, to a zero voltage.

Figure 3:
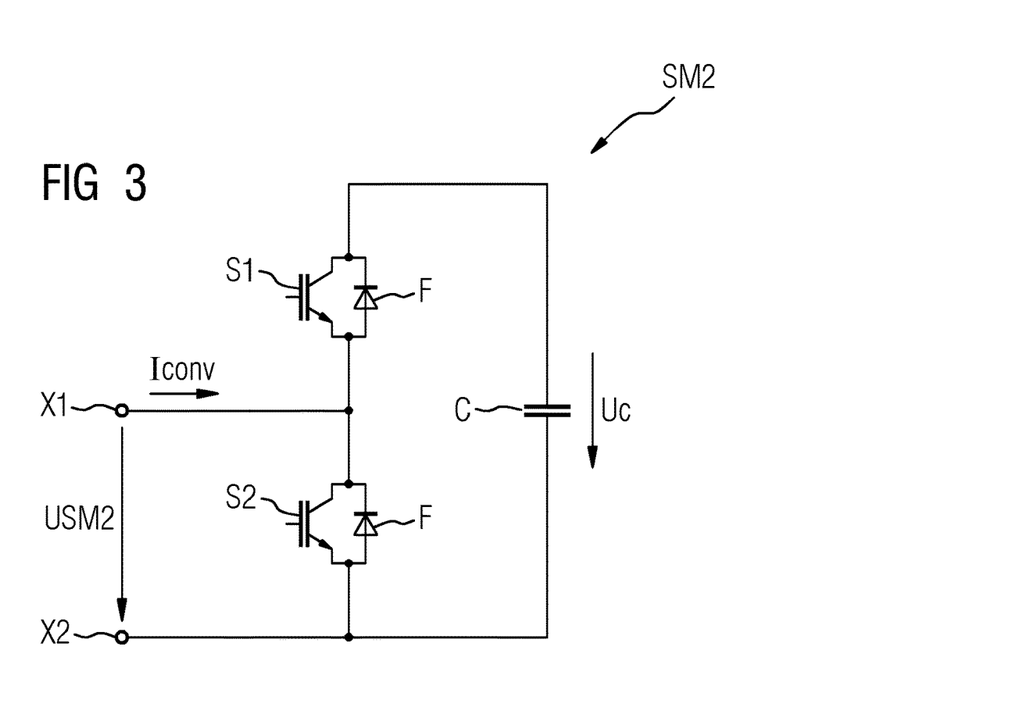
FIG. 3 is a schematic illustration of the switching module of a second type.

FIG. 3 shows a switching module SM2 of the second type which is suitable for the power converter of FIG. 1 and which is connected in a half-bridge circuit. A parallel circuit of a first semiconductor switch S1 and a capacitor C is arranged in a capacitor branch. A second semiconductor switch is arranged in a bridge branch between two terminals X1, X2 of the first switching module SM2. A freewheeling diode F is connected antiparallel with each of the two semiconductor switches S1, S2. Through suitable drive of the two semiconductor switches S1, S2 a switching module voltage USM2 can be generated at the terminals X1, X2 that corresponds to the capacitor voltage Uc, or, however, to a zero voltage.

Figure 4:
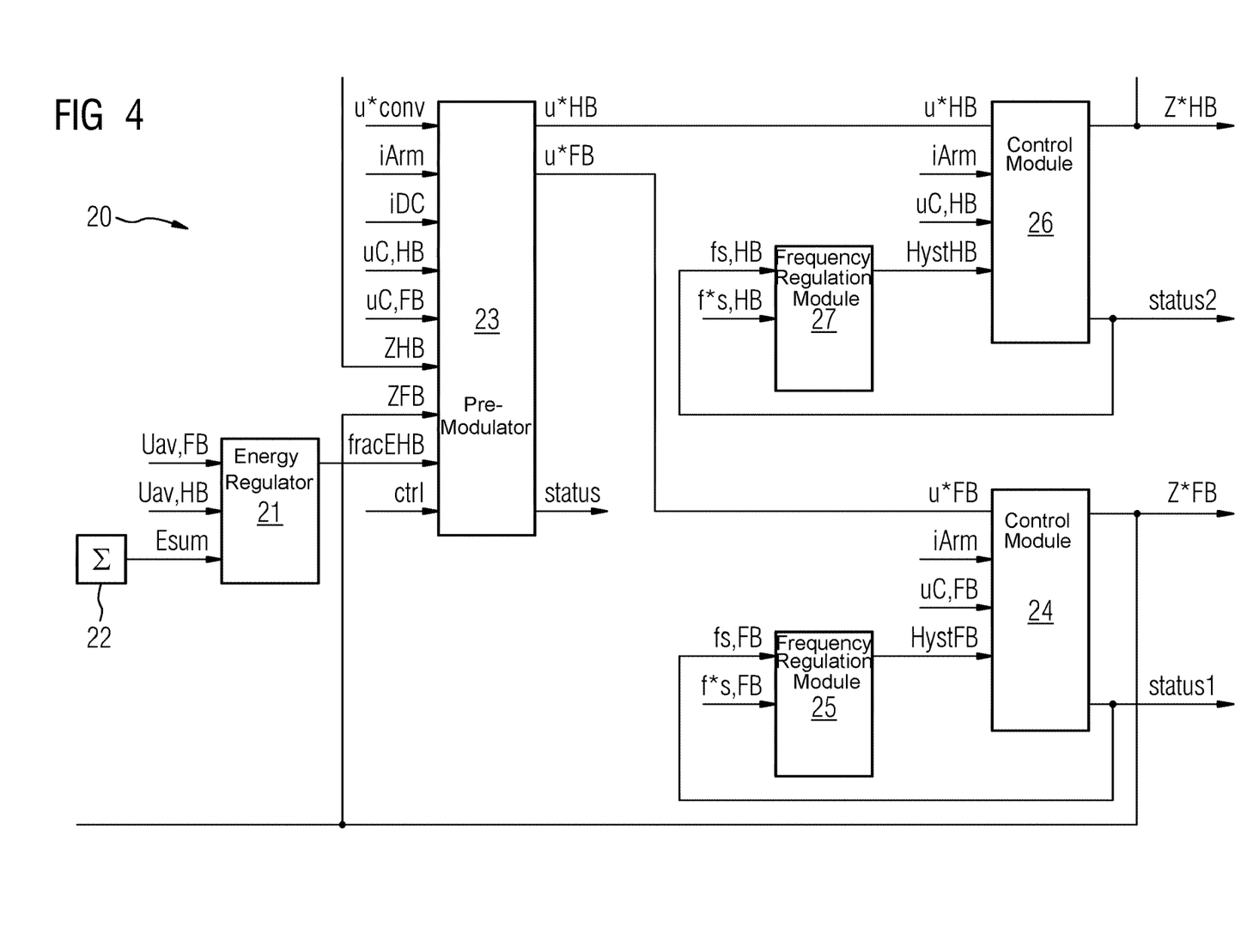
FIG. 4 is a schematic representation of a regulation apparatus for carrying out a method of the invention.

A regulation apparatus 20, which in particular can be employed as the regulation apparatus 12 of FIG. 1 or as its part, is illustrated in FIG. 4. The regulation apparatus 20 contains an energy regulator 21, to the input side of which a mean energy store voltage Uav,FB of the switching modules of the first type, a mean energy store voltage Uav,HB of the switching modules of the second type, and a total energy Esum of the power converter ascertained by means of a summing element 22, are supplied. At the output side, the energy regulator provides an energy specification fracEHB for the switching modules of the second type, and transmits this to a pre-modulator 23. The pre-modulator 23 also contains as input values the voltage setpoint value u*conv for the arm voltage to be set for each power converter arm, an arm current iArm, a direct-voltage side current iDC, the switching module voltages uC,FB, uC,HB of the switching modules of the first and of the second type, and state information ZFB, ZHB regarding the switching states of the switching modules. The pre-modulator further contains a control input ctrl. On the output side, the pre-modulator 23 provides a first setpoint value portion u*FB and a second setpoint value portion u*HB as well as status information status. The first setpoint value portion u*FB is passed to a first control module 24 which also receives the arm current, the switching module voltages uCFB and an output signal HystFB of a first frequency regulation module 25 at the input side. At the output side, the first control module 24 provides status information status1 and a specification z*FB concerning the switching states of the switching modules of the first type that are to be generated. At the input side, the first frequency regulation module 25 receives the switching frequencies fs,FB of the switching modules of the first type, as well as a corresponding switching frequency setpoint value f*sFB. The second setpoint value portion u*HB is correspondingly passed to a second control module 26 which also receives the arm current, the switching module voltages uCHB and an output signal HystHB of a second frequency regulation module 27 at the input side. At the output side the second control module 26 provides status information status2 and a specification z*HB concerning the switching states of the switching modules of the second type that are to be generated. At the input side the second frequency regulation module 27 receives the switching frequencies fsHB of the switching modules of the second type, as well as a corresponding switching frequency setpoint value f*sHB.

Figure 5:
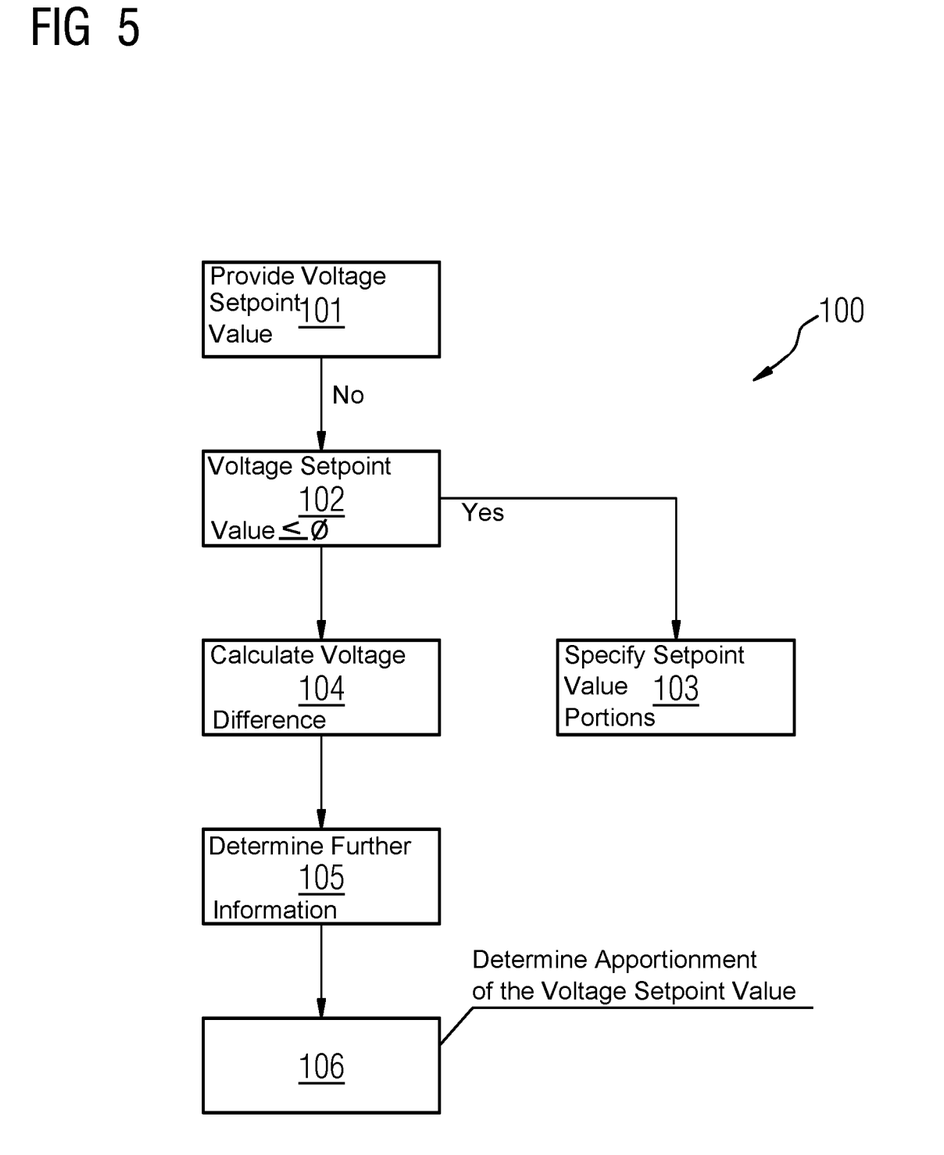
FIG. 5 is a flow chart of a setpoint value apportionment for the method according to the invention.

A schematic flow diagram 100 is illustrated in FIG. 5, with reference to which an example of an apportionment of the voltage setpoint value into the first setpoint value portion u*FB for control of the switching modules of the first type and a second setpoint value portion u*HB for control of the switching modules of the second type is explained. Initially, in a first step 101, a voltage setpoint value u*conv for the arm voltage to be set in one of the power converter arms is provided. In a second step 102, a check is performed as to whether the voltage setpoint value u*conv is smaller than or equal to zero. If this is the case, then in a third step 103 the setpoint value portions are specified as follows: u*FB=u*conv; u*HB=0. f u*conv>0 then in a fourth step 104 a voltage difference e is calculated in accordance with the formula e=u*conv−(uHB+uFB), wherein uFB is the actual (total) voltage of the switching modules of the first type, and uHB is the actual voltage of the switching modules of the second type in the power converter arm concerned. Further information is determined in a fifth step 105: a power flow direction (rectifier operation or inverter operation), arm current, maximum and minimum switching module voltages of the switching modules of the first and of the second type, as well as instantaneous switching module states of the switching modules in the power converter arm concerned. In a further step 106, the apportionment of the voltage setpoint value u*conv into the first and second setpoint value portions u*FB, u*HB is determined on the basis of this information. If, for example, e=0, then u*FB is set equal to uFB and u*HB is set equal to uHB. As a departure from this, if the energy specifications require a selection for switching of switching modules of the first type, u*HB=uHB and u*FB=uFB+e can be specified. The setpoint value portions are then converted into corresponding switching commands or switching operations for the individual switching modules by means of suitable control apparatuses.

The invention claimed is:

1. A method for regulation of a power converter configuration having at least one power converter arm with a series circuit of two-pole switching modules, wherein each of the two-pole switching modules having a plurality of semiconductor switches and an energy store, wherein at least some of the two-pole switching modules are switching modules of a first type and at least some further ones of the two-pole switching modules are switching modules of a second type, which comprises the steps of:
apportioning a voltage setpoint value of a power converter regulator into a first setpoint value portion and a second setpoint value portion;
apportioning the voltage setpoint values by means of a pre-modulator;
transmitting the first setpoint value portion to a first control module for generating control signals for control of the switching modules of the first type on a basis of the first setpoint value portion;
transmitting the second setpoint value portion to a second control module for generating control signals for control of the switching modules of the second type on a basis of the second setpoint value portion;
driving the switching modules of the first type on a basis of the first setpoint value portion;
driving the switching modules of the second type on a basis of the second setpoint value portion; and
determining, by means of the pre-modulator, a load flow direction of a power converter load flow from an arm current of the power converter configuration and a direct current on a direct-voltage side.

2. The method according to claim 1, wherein, when the power converter configuration is operating:
generating, a positive switching module voltage, a negative switching module voltage or a zero voltage at any one time at connecting terminals of the switching modules of the first type; and
generating a positive switching module voltage or a zero voltage at any one time at connecting terminals of the switching modules of the second type.

3. The method according to claim 1, wherein the voltage setpoint value is apportioned while taking into consideration a number of the switching modules of the first type and a number of the switching modules of the second type in the at least one power converter arm, as well as taking into account switching states of the two-pole switching modules.

4. The method according to claim 1, wherein the voltage setpoint value is apportioned taking energy store voltages of the two-pole switching modules into consideration.

5. The method according to claim 1, which further comprises operating the two-pole switching modules of the at least one power converter arm with a modulation depth greater than one.

6. The method according to claim 1, wherein:
the at least one power converter arm is one of a plurality of power converters arms; and
the voltage setpoint value is apportioned while taking into consideration a number of the switching modules of the first type and a number of the switching modules of the second type in each of the power converter arms, as well as taking into account switching states of the two-pole switching modules.

7. A method for regulation of a power converter configuration having at least one power converter arm with a series circuit of two-pole switching modules, wherein each of the two-pole switching modules having a plurality of semiconductor switches and an energy store, wherein at least some of the two-pole switching modules are switching modules of a first type and at least some further ones of the two-pole switching modules are switching modules of a second type, which comprises the steps of:
apportioning a voltage setpoint value of a power converter regulator into a first setpoint value portion and a second setpoint value portion;
apportioning the voltage setpoint value by means of a pre-modulator;
carrying out an energy regulation by means of an energy regulator, wherein an energy specification for a total energy of the switching modules of the first type that is to be set is provided at an output of the energy regulator;
transmitting the energy specification to the pre-modulator;
apportioning the voltage setpoint value in dependence on the energy specification;
transmitting the first setpoint value portion to a first control module for generating control signals for control of the switching modules of the first type on a basis of the first setpoint value portion;
transmitting the second setpoint value portion to a second control module for generating control signals for control of the switching modules of the second type on a basis of the second setpoint value portion;
driving the switching modules of the first type on a basis of the first setpoint value portion; and driving the switching modules of the second type on a basis of the second setpoint value portion.

8. The method according to claim 7, which further comprises determining the energy specification depending on a mean energy store voltage of the switching modules of the first type and a mean energy store voltage of the switching modules of the second type.

9. A power converter configuration, comprising:
- at least one power converter arm having a series circuit of two-pole switching modules, wherein each of said two-pole switching modules having a plurality of semiconductor switches and an energy store, at least some of said two-pole switching modules are switching modules of a first type and at least some further one of said two-pole switching modules are switching modules of a second type;
- a regulator apparatus for regulation of the power converter configuration and having a pre-modulator, a first control module and a second control module, said regulator apparatus configured to:
  - apportion a voltage setpoint value of said regulator apparatus into a first setpoint value portion and a second setpoint value portion by means of said pre-modulator;
  - transmit the first setpoint value portion to said first control module for generating control signals for control of said switching modules of said first type on a basis of the first setpoint value portion;
  - transmit the second setpoint value portion to said second control module for generating control signals for control of said switching modules of said second type on a basis of the second setpoint value portion;
  - drive said switching modules of the first type on a basis of the first setpoint value portion;
  - drive said switching modules of the second type on a basis of the second setpoint value portion; and
  - determine, by means of said pre-modulator, a load flow direction of a power converter load flow from an arm current of the power converter configuration and a direct current on a direct-voltage side.

\* \* \* \* \*